United States Patent [19]
Purcell

[11] 3,851,712
[45] Dec. 3, 1974

[54] COUNTERWEIGHT ASSEMBLY FOR VEHICLE-MOUNTED IMPLEMENT

[75] Inventor: Robert J. Purcell, Washington, Ill.

[73] Assignee: Caterpillar Tractor Co., Peoria, Ill.

[22] Filed: Jan. 18, 1973

[21] Appl. No.: 324,660

[52] U.S. Cl. ............................ 172/801, 172/611
[51] Int. Cl. ........................................... E02f 3/76
[58] Field of Search ........... 172/611, 801, 276, 802, 172/804, 805, 806, 809; 280/150 E, 150 D; 214/767

[56] References Cited
UNITED STATES PATENTS

| | | | |
|---|---|---|---|
| 2,625,755 | 1/1953 | Drott | 178/801 |
| 3,023,024 | 2/1962 | McAdams et al. | 280/150 E |

FOREIGN PATENTS OR APPLICATIONS

| | | | |
|---|---|---|---|
| 1,057,534 | 5/1959 | Germany | 280/150 E |

Primary Examiner—Stephen C. Pellegrino
Attorney, Agent, or Firm—Phillips, Moore, Weissenberger, Lempio & Strabala

[57] ABSTRACT

A vehicle has mounted thereto an implement assembly which includes a pair of forwardly extended arms on either side of the vehicle, and an implement mounted to the forwardly extending ends of these arms. The rear portions of the arms are pivotally fixed relative to the vehicle about a pivot axis transverse of the vehicle. The implement assembly is of the type which has its center of gravity spaced laterally of the longitudinal axis of the vehicle, on one side thereof. A counter weight is securable relative to such implement assembly, rearwardly of the transverse pivot axis of the arms, and positioned so as to define an implement assembly-counter weight center of gravity which is close to the longitudinal axis of the vehicle.

2 Claims, 2 Drawing Figures

COUNTERWEIGHT ASSEMBLY FOR VEHICLE-MOUNTED IMPLEMENT

BACKGROUND OF THE INVENTION

Vehicle-mounted implements such as a bulldozer blade, earthmoving bucket, lift fork, or the like, are conventionally mounted through a pair of laterally spaced arms to rearwardly disposed pivotal connections on the vehicle, and the vertical movement of the forward portions of the arms is controlled by a suitable lift system disposed between the arms or implement and forward portion of the vehicle. The weight of such an implement is therefore primarily supported by the lift system so that the normal carrying pressure, even without a load on the implement, is high. Even when the lift system includes, for example, a pair of extendible hydraulic cylinders, carrying pressures in excess of 1,000 psi have been observed. Since operating pressures are additive to such carrying pressures, the entire fluid circuit must be designed extremely ruggedly and with great expense in order to withstand the great pressures encountered.

Another problem occurs when the center of gravity of the implement and its associated mounting arm structure is laterally spaced from the longitudinal central axis of the vehicle. In such an instance, the resultant loading on the pivotal connections on the opposite sides of the vehicle is unequal. An unbalanced force couple is thus caused by these unequal loads which detrimentally affects the operation and balance of the vehicle.

A laterally spaced implement center of gravity poses particularly difficult problems when the implement is a large angled bulldozer blade. If such an angled blade is moved diagonally forwardly toward its leading edge in order to position its center of gravity on the longitudinal axis of the vehicle, the load on the supporting lift cylinders is increased and poorer blade digging and manipulating of the blade results. This is so because the mechanical advantage becomes less efficient and with large loads on the cutting edge there is sometimes not enough latitude in the pressure in the implement fluid control circuit to move the blade because of the upper limits established normally by safety pressure relief valves.

Still further, with a blade angled to the right, it is desirable to keep its center on the right side of the longitudinal central axis of the vehicle in order to minimize high loading of the leading portion of the blade which tends to steer the vehicle to the left.

Of interest in this area are U.S. Pat. No. 2,418,251 to Drott and U.S. Pat. No. 2,625,755 to Drott.

SUMMARY OF THE INVENTION

It is an object of this invention to provide a counter weight system in an implement assembly-carrying vehicle for lowering the loads imposed on the lifting system thereof.

It is a further object of this invention to provide a counter weight system in an implement assembly-carrying vehicle which, while fulfilling the above object, acts to determine an implement assembly-counter weight center of gravity which is substantially on the longitudinal axis of the vehicle, though the center of gravity of the implement assembly itself may be spaced laterally from the longitudinal axis of the vehicle.

Broadly stated, the invention is in a vehicle having an implement assembly mounted thereon, said implement assembly having its center of gravity spaced from the longitudinal axis of the vehicle on one side of said longitudinal axis. The inventive improvement comprises counter weight means securable relative to said implement assembly on the other side of said longitudinal axis of the vehicle, and defining with the implement assembly an implement-and-counter weight assembly the center of gravity of which is closer to said longitudinal axis of the vehicle than the center of gravity of the implement assembly alone.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
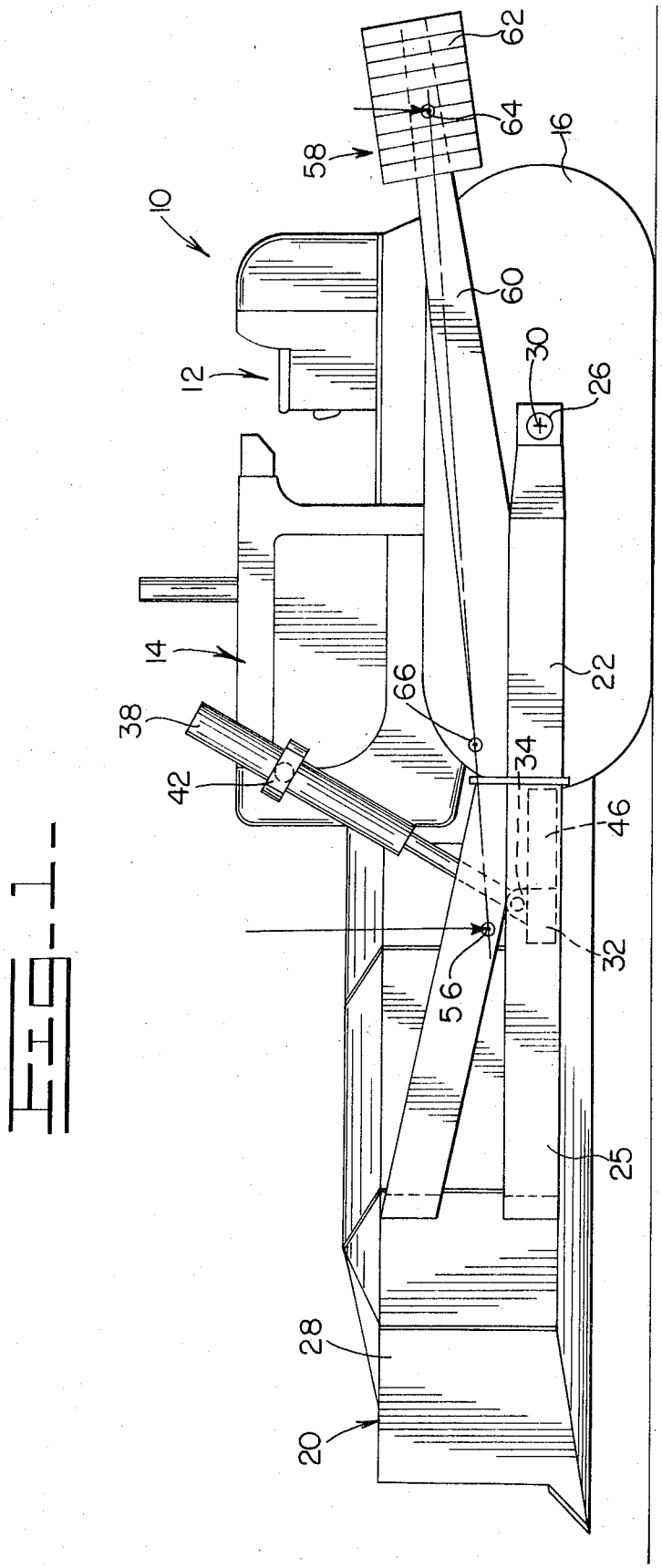
FIG. 1 is a side elevation of a tractor incorporating the invention.
Figure 2:
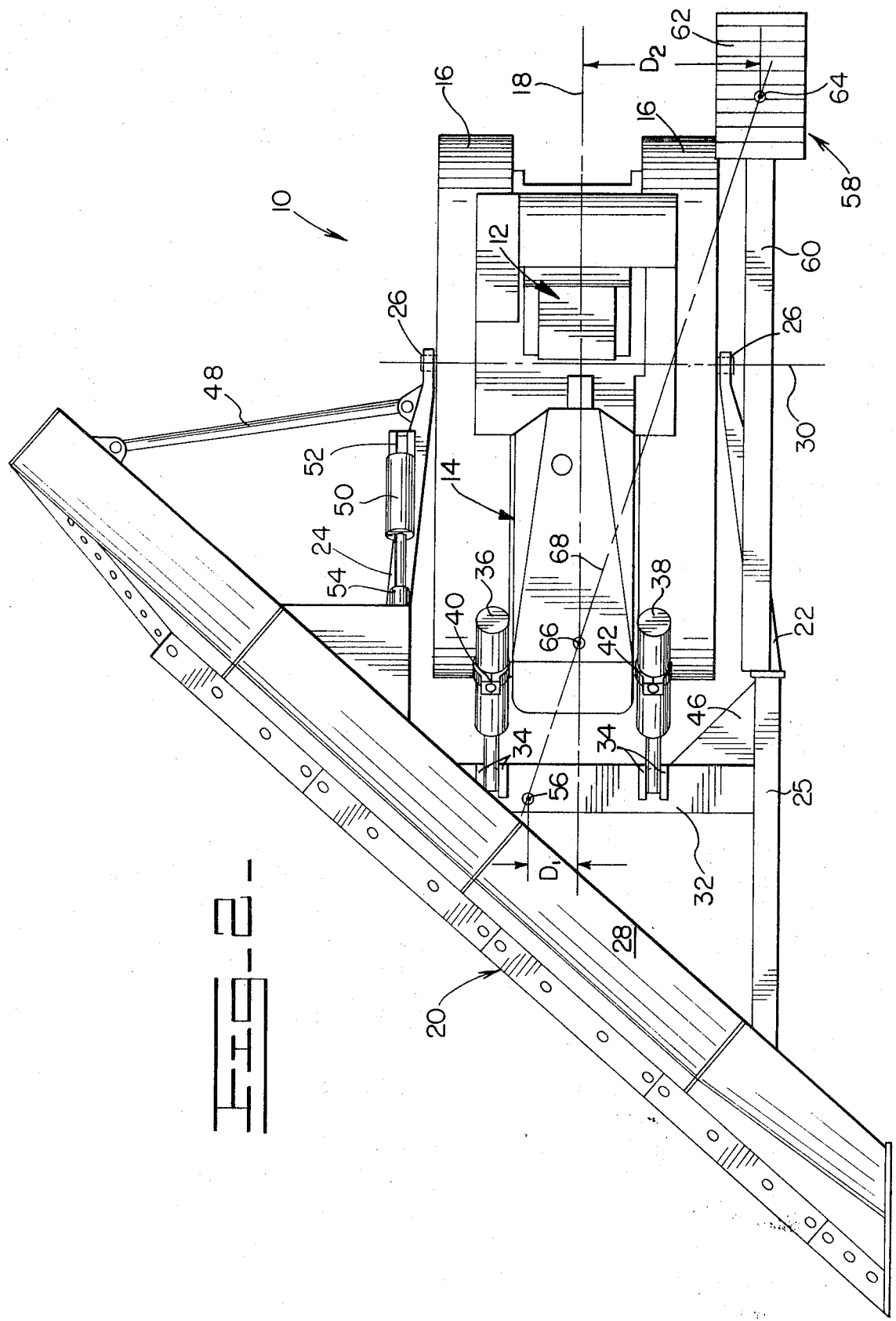
FIG. 2 is a plan view of the tractor of FIG. 1.

With reference to the drawings, a vehicle 10 in the form of a track-type tractor includes an operator station 12 and a forwardly disposed engine compartment 14. A pair of tracked undercarriages 16 substantially equidistantly spaced from the longitudinal axis 18 of the vehicle 10 support the vehicle 10.

An implement assembly 20 is associated with the vehicle 10. Such implement assembly 20 includes push arms 22, 24 having the rear portions thereof pivotally mounted by means of trunnions 26 to the undercarriages 16 on either side of the vehicle 10. The push arms 22,24 extend forwardly from these rear pivotal portions (push arm 22 having an extension 25 as part thereof), and a large angled blade 28, also part of the implement assembly 20, is mounted to the forwardly extending portions of the push arms 22,24. The push arms 22,24 are pivotable about a common axis 30 transverse of vehicle.

A transverse beam 32 is secured to the rear of the blade 28 and to the left push arm 22 and is integrally provided with laterally spaced pairs of upstanding ears 34. A pair of extendible lift cylinders 36 and 38 are pivotally mounted as at 40 and 42 to the engine compartment frame 14 and have their lower extremities pivotally secured to the ears 34. A gusset 46 and a right stabilizing brace 48 provide additional rigidity for the blade 28, while an extendible tilt cylinder 50 is mounted between a pivotal connection 52 to the right push arm 24 and to a pivotal connection 54 on an extension to the back of the blade 28 for changing the cutting angle of the blade 28. For example, extending the tilt cylinder 50 causes the left side of the blade 28 to drop while the right side is forced upwardly.

In this embodiment, the blade 28 is approximately 40 feet long and the implement assembly 20 weighs approximately 36,500 lbs. The center of gravity of the 36,500 lb. implement assembly is shown at 56 forwardly of the ears 34, so that the lift cylinders 36,38 experience a carrying pressure in excess of 1,000 psi. Further, since the center of gravity 56 is displaced a lateral distance $D_1$ away from the longitudinal axis 18 on one side thereof, the resultant loading on trunnions 26 is unequal.

To balance the implement assembly 20 and to reduce the carrying forces imposed on the lift cylinders 36 and 38, counter weight means 58 including a cantilevered frame 60 and a counter weight 62 are secured to the left push arm 22 and relative to the implement assembly 20, on the other side of the longitudinal axis 18.

The counter weight means 58 are positioned rearwardly of the transverse axis 30, with the center of gravity 64 thereof disposed in such rearward position as shown. In addition, such counter weight means 58 center of gravity 64 is positioned laterally a distance $D_2$ from the longitudinal axis 18, on the other side of said longitudinal axis 18 from the center of gravity 56 of the implement assembly 20.

In fact, the counter weight means 58 are so sized and positioned that the ratio of (i) the weight of the implement assembly 20 (ii) the weight of the counter weight means 58 is substantially equal to the ratio of (i) the lateral distance $D_2$ of the center of gravity 64 of the counter weight means 58 from the longitudinal axis 18 of the vehicle 10 to (ii) the lateral distance $D_1$ of the center of gravity 56 of the implement assembly 20 from the longitudinal axis 18 of vehicle 10. With these proportions, the resultant center of gravity of both the implement assembly 20 and the counter weight means 58 is shown at 66 as the intersection of the axis 18 and a line 68 between points 56 and 64.

With a counter weight 62 of 9,700 lbs., for example, the forces on the trunnions 26 are modified as follows:

|  | Without Cwt. | With Cwt. |
|---|---|---|
| Left | 15,110 lbs. | 12,994 lbs. |
|  | 27.7° upward/rearward | 27.7° downward/rearward |
| Right | 13,290 lbs. | 12,994 lbs. |
|  | 16.1° downward/rearward | 27.7° downward/rearward |

Further, the pressure in the lift cylinders 36 and 38 necessary to carry the blade 28 are modified as follows:

| Without Cwt. | With Cwt. |
|---|---|
| 1,013 psi | 872 psi |

Therefore, the above-described inventive placement of the counter weight means 58 decreases the normal carrying pressure of the left cylinders 36,38 so that a greater range of pressure is still available for manipulation of the implement during high loading thereof, and the resultant forces on the trunnions 26 are not only balanced but also decreased to provide greater stability of the vehicle 10 as well as longer potential trunnion life.

What is claimed is:

1. In a vehicle having a longitudinal axis and an implement assembly comprising a pair of push arms, means pivotally mounting the same on a transverse axis to the vehicle, said push arms being disposed on either side and extending forwardly of the vehicle, and an implement mounted to the forwardly extending ends of the push arms, said implement assembly having its center of gravity spaced from the longitudinal axis of the vehicle on one side of said longitudinal axis, the improvement which comprises counter weight means secured to said implement assembly on the other side of said longitudinal axis and rearwardly of said transverse axis of the vehicle, and defining with the implement assembly an implement-and-counter weight assembly the center of gravity of which is closer to said longitudinal axis of the vehicle than the center of gravity of the implement assembly alone.

2. The vehicle of claim 1 wherein the counter weight means are sized and positioned so that the ratio of (i) the weight of the implement assembly to (ii) the weight of the counter weight means is substantially equal to the ratio of (i) the lateral distance of the center of gravity of the counter weight means from the longitudinal axis of the vehicle to (ii) the lateral distance of the center of gravity of the implement assembly from the longitudinal axis of the vehicle, so that the implement-and-counter weight assembly center of gravity is substantially on the longitudinal axis of the vehicle.

* * * * *